(12) United States Patent
Borja

(10) Patent No.: US 10,612,408 B2
(45) Date of Patent: Apr. 7, 2020

(54) CONTROL RINGS

(71) Applicant: United Technologies Corporation, Farmington, CT (US)

(72) Inventor: Mark Borja, Palm Beach Gardens, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 131 days.

(21) Appl. No.: 14/705,273

(22) Filed: May 6, 2015

(65) Prior Publication Data

US 2016/0326900 A1 Nov. 10, 2016

(51) Int. Cl.
*F01D 11/18* (2006.01)
*F16J 15/44* (2006.01)

(52) U.S. Cl.
CPC .......... *F01D 11/18* (2013.01); *F16J 15/442* (2013.01); *F16J 15/445* (2013.01); *F05D 2240/11* (2013.01); *F05D 2300/5023* (2013.01); *F05D 2300/5024* (2013.01); *F05D 2300/50212* (2013.01)

(58) Field of Classification Search
CPC .......... F01D 11/18; F01D 11/20; F01D 11/24; F01D 11/16; F05D 2300/50212; F05D 2300/5023; F05D 2300/5024; F05D 2240/11; F05D 2240/55; F16J 15/442; F16J 15/445
USPC ...... 415/173.1, 173.2, 173.3, 134, 136, 138, 415/139

See application file for complete search history.

(56) References Cited

U.S. PATENT DOCUMENTS

| 4,460,311 | A | * | 7/1984 | Trappmann | F01D 11/12 415/116 |
| 4,536,127 | A | * | 8/1985 | Rossmann | F01D 11/122 277/415 |
| 5,593,278 | A | * | 1/1997 | Jourdain | F01D 11/18 415/116 |
| 2007/0020105 | A1 | * | 1/2007 | Albrecht | F01D 5/147 416/224 |
| 2009/0169368 | A1 | * | 7/2009 | Schlichting | F01D 11/122 415/173.1 |
| 2011/0027068 | A1 | * | 2/2011 | Floyd, II | F01D 11/24 415/13 |

(Continued)

FOREIGN PATENT DOCUMENTS

| EP | 2034132 A2 | 3/2009 |
| EP | 2518274 A2 | 10/2012 |

(Continued)

OTHER PUBLICATIONS

U.S. Appl. No. 62/094,691, filed Dec. 19, 2014.

(Continued)

*Primary Examiner* — Christopher Verdier
(74) *Attorney, Agent, or Firm* — Cantor Colburn LLP

(57) ABSTRACT

A control ring for use in a gas turbine engine includes a control ring segment defining a centerline axis. The control ring segment includes an inner diameter surface and an outer diameter surface. A thermally isolating contact is operatively connected to at least one of the inner diameter surface and the outer diameter surface. The thermally isolating contact has lower thermal conductivity than the control ring.

6 Claims, 4 Drawing Sheets

(56) References Cited

U.S. PATENT DOCUMENTS

| 2013/0149120 | A1* | 6/2013 | Munshi .................. F01D 25/08 |
| | | | 415/177 |
| 2014/0186152 | A1 | 7/2014 | McCaffrey et al. |
| 2016/0177768 | A1* | 6/2016 | Borja ........................ F01D 5/02 |
| | | | 415/134 |

FOREIGN PATENT DOCUMENTS

| EP | 2642082 | A1 | 3/2013 |
| EP | 3034810 | A1 | 6/2016 |

OTHER PUBLICATIONS

Partial EP SR for EP Application No. 16157952.9, dated Dec. 12, 2016, 8 pages.
European Patent Office, Communication Pursuant to Article 94(3) EPC, Application No. 16157952.9-1008, dated Dec. 16, 2019 (5 pp.).

* cited by examiner

CONTROL RINGS

STATEMENT REGARDING FEDERALLY SPONSORED RESEARCH OR DEVELOPMENT

This invention was made with government support under contract number N68335-13-C-0005 awarded by the United States Navy. The government has certain rights in the invention.

BACKGROUND OF THE INVENTION

1. Field of the Invention

The present disclosure relates to blade tip clearance systems for use in gas turbine engines, and more particularly to control rings for blade tip clearance systems.

2. Description of Related Art

Leakage of flow-path air may occur in turbomachinery between the tips of a rotating blade structure and the outer static structure. This leakage has a negative effect on performance, efficiency, fuel burn, and component life. Turbomachinery with a wide operating range, such as an aircraft gas turbine engine, conventionally requires large tip clearances due to the mismatch in thermal responses between the rotating structure and the static structure. A static structure with a rapid thermal response rate will experience significant closure to the rotating structure during rapid decelerations. Conversely, a static structure with a slow thermal response will experience significant closure to the rotating structure during rapid accelerations. Further, the rotating blade structure generally includes two rotating structures, the blade airfoils that generally have fast thermal response rates and the rotor disk, that generally responds slower.

As a result, both configurations require large tip clearances throughout the operating range. Large tip clearance can equate to lower efficiency. By minimizing the tip clearance between the rotating and static structures efficiency can be improved. In some designs, an annular control ring is provided on the outer static structure to control the thermal response of the blade outer air seal system, at least under some operational conditions.

Such conventional methods and systems have generally been considered satisfactory for their intended purpose. However, there is still a need in the art for an improved sealing system. The present disclosure provides a solution for this need.

SUMMARY

A control ring for use in a gas turbine engine includes a control ring segment defining a centerline axis. The control ring segment includes an inner diameter surface and an outer diameter surface. A thermally isolating contact is operatively connected to at least one of the inner diameter surface and the outer diameter surface. The thermally isolating contact has lower thermal conductivity than the control ring.

The control ring segment can be one of a plurality of control ring segments joined together to form a full control ring configured to be held in a control ring carrier for thermal isolation from an outer air seal.

In a further embodiment of any of the foregoing embodiments, the thermally isolating contact may additionally and/or alternatively be one of a plurality of thermally isolating contacts on the outer diameter surface of the control ring segment. Further, the thermally isolating contacts can be circumferentially spaced apart from one another.

In a further embodiment of any of the foregoing embodiments, the thermally isolating contact may additionally and/or alternatively be one of a plurality of thermally isolating contacts on the inner diameter surface of the control ring segment. Further, the thermally isolating contacts may be circumferentially spaced apart from one another.

In a further embodiment of any of the foregoing embodiments, the thermally isolating contact may additionally and/or alternatively be a coating disposed on at least one of the inner diameter surface or the outer diameter surface of the control ring.

In a further embodiment of any of the foregoing embodiments, the control ring segment may additionally and/or alternatively include a cavity on the outer diameter surface with a thermally isolating inlay defined therein. Further, the thermally isolating inlay can extend to the outer diameter surface and can define the thermally isolating contact.

In a further embodiment of any of the foregoing embodiments, the control ring segment may additionally and/or alternatively include a cavity on the inner diameter surface with a thermally isolating inlay defined therein. Further, the thermally isolating inlay can extend to the inner diameter surface and can define the thermally isolating contact.

In a further embodiment of any of the foregoing embodiments, the thermally isolating inlay may additionally and/or alternatively be at least one of an axially extending cylinder, a radially extending cylinder, or a wedge shape.

In a further embodiment of any of the foregoing embodiments, the cavity may additionally and/or alternatively be one of a plurality of cavities in the control ring segment. Further, the cavities can be circumferentially spaced apart from one another.

In another aspect, a control ring for use in a gas turbine engine includes a control ring segment defining a centerline axis. The control ring segment includes an internal cavity defined between the inner and outer diameter surfaces. The internal cavity is configured to contain a material having a higher heat capacitance than the control ring.

In a further embodiment of any of the foregoing embodiments, the control ring segment may additionally and/or alternatively include a plug between the internal cavity and the outer diameter surface to enclose the internal cavity.

In a further embodiment of any of the foregoing embodiments, the plug may additionally and/or alternatively be brazed into the outer diameter surface of the control ring segment.

In a further embodiment of any of the foregoing embodiments, the control ring segment may additionally and/or alternatively be one of a plurality of control ring segments joined together to form a full control ring configured to be held in a control ring carrier for thermal isolation from an outer air seal.

In a further embodiment of any of the foregoing embodiments, the control ring may additionally and/or alternatively include a fill material having a higher heat capacitance than the control ring disposed within the internal cavity.

In a further embodiment of any of the foregoing embodiments, the fill material may additionally and/or alternatively be a fluid sealed inside the internal cavity.

In yet another aspect, a control ring for use in a gas turbine engine includes a plurality of radially stacked rings. Each radially stacked ring includes a plurality of arcuate segments joined together to form the ring.

In a further embodiment of any of the foregoing embodiments, at least one of the rings may additionally and/or alternatively be made from a different material from another one of the rings.

In a further embodiment of any of the foregoing embodiments, seams may additionally and/or alternatively be defined between the respective segments of the radially stacked rings. Further, the respective seams of one of the radially stacked rings can be circumferentially offset from the respective seams of the adjacent radially stacked ring.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
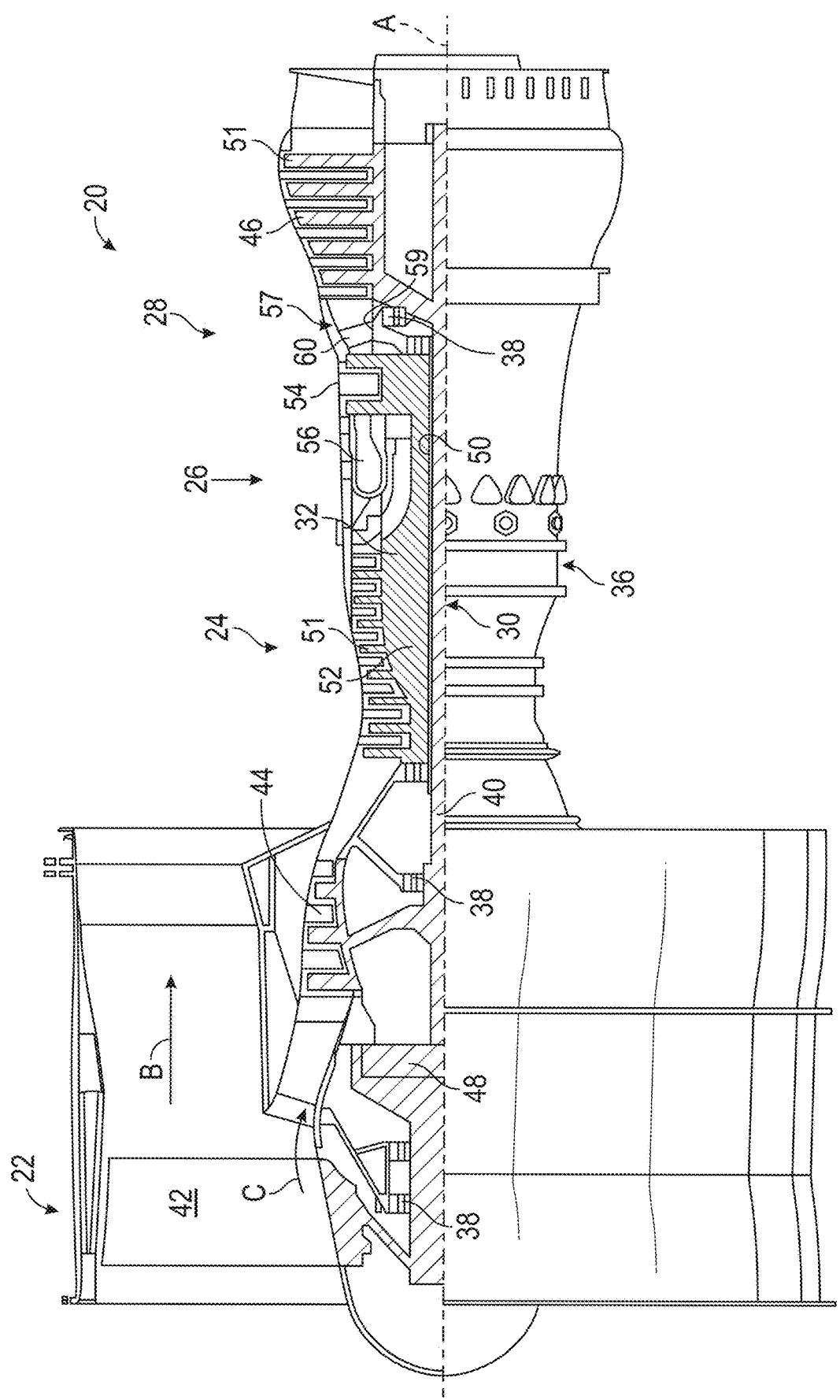
FIG. 1 is a schematic cross-sectional side elevation view of an exemplary embodiment of a gas turbine engine constructed in accordance with the present disclosure, showing the location of the blades.

Reference will now be made to the drawings wherein like reference numerals identify similar structural features or aspects of the subject disclosure. For purposes of explanation and illustration, and not limitation, a cross-sectional side elevation view of an exemplary embodiment of a gas turbine engine accordance with the disclosure is shown in FIG. 1 and is designated generally by reference character 20. Other embodiments of gas turbine engines in accordance with the disclosure, or aspects thereof, are provided in FIGS. 2-6, as will be described. The systems and methods described herein can be used to provide improved tip clearance control between the rotating blade tip and static blade outer air seal at various operating conditions experienced in gas turbine engines.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 that are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five (5:1). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that embodiments of the present invention are applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R.)/(518.7°\ R.)]^{0.5}$. The "Low corrected fan tip speed" as disclosed herein according to one non-limiting embodiment is less than about 1150 ft/second.

Figure 2:
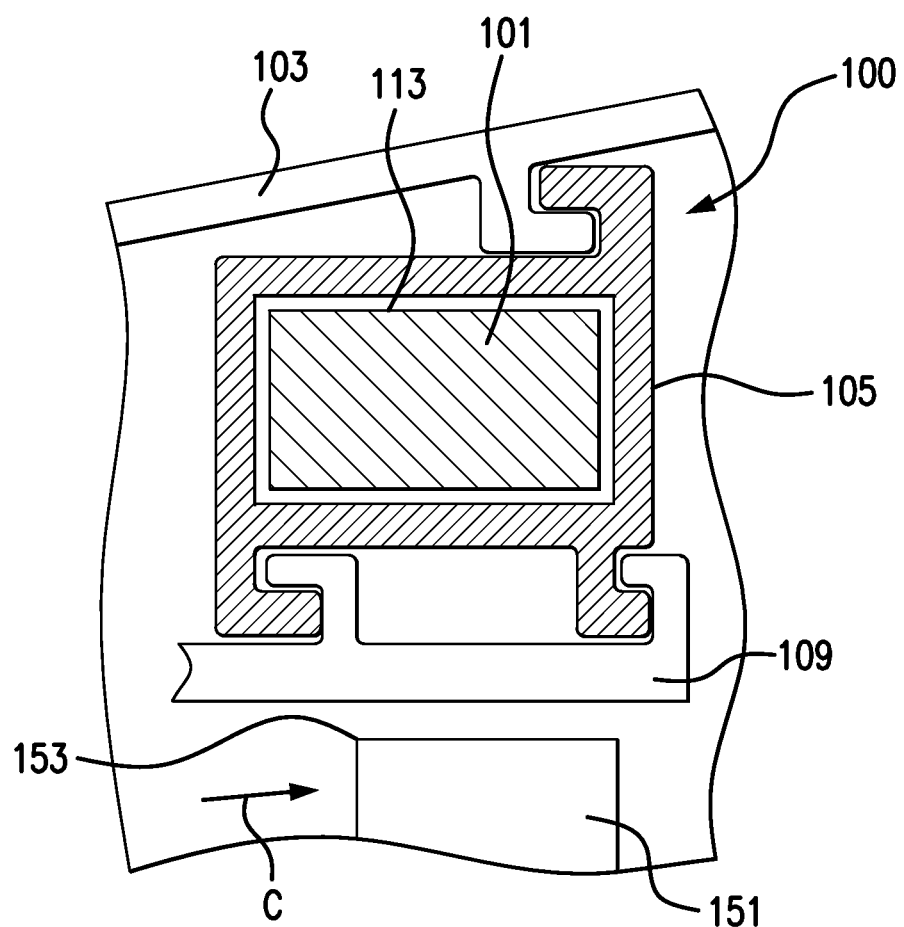
FIG. 2 is a schematic cross-sectional side elevation view of a blade tip clearance system constructed in accordance with embodiments of the present disclosure, showing the control ring and the carrier.

As shown in FIGS. 1 and 2, gas turbine engine 20 includes rotating structures, e.g. high and low speed spools 32 and 30, with a plurality of rotating blades 51 and 151. With reference now to FIG. 2, each of the plurality of rotating blades 151 includes a radially outward tip 153. A blade tip clearance system 100 is located outboard of the radially outward tip 153. An external case 103 surrounds blade tip clearance system 100. Blade tip clearance system 100 includes a control ring carrier 105 and a control ring 101 defined within carrier 105. Control ring 101 defines a centerline axis, e.g. engine central longitudinal axis A. An outer air seal 109 is operatively connected to carrier 105 radially inward from control ring 101 and carrier 105.

Figure 3A:
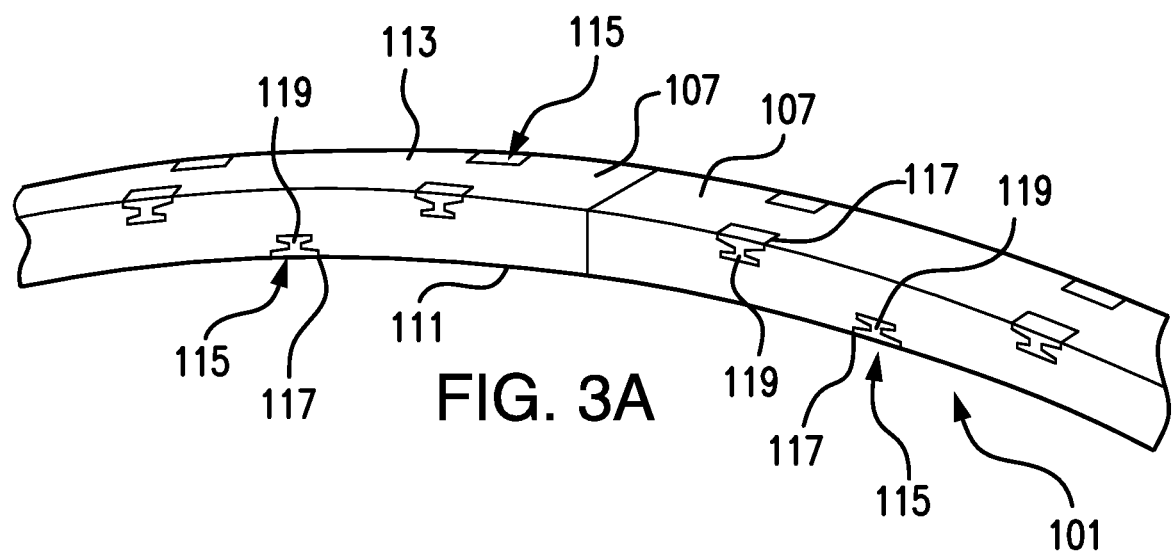
FIG. 3A is a perspective view of a portion of the control ring of FIG. 2, showing the control ring having wedge shaped thermally isolating inlays.
Figure 3B:
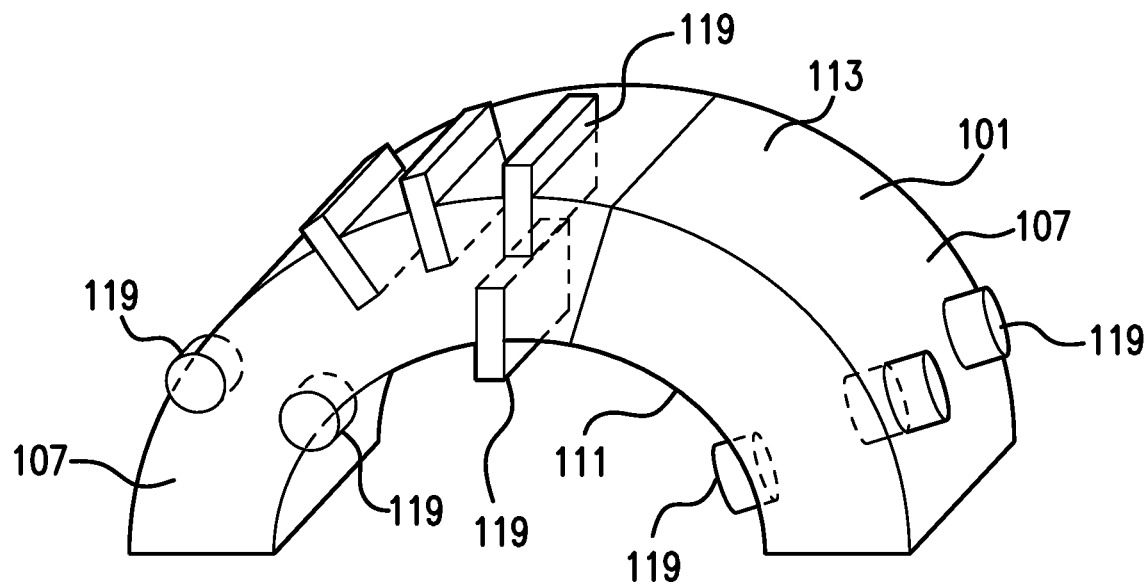
FIG. 3B is a perspective view of a portion of the control ring of FIG. 2, showing the control ring having cylindrical and block shaped thermally isolating inlays.

With reference now to FIGS. 2-3B, control ring 101 includes control ring segments 107 joined together to form a full control ring 101. While only two segments are shown, those skilled in the art will readily appreciate that control ring 101 can be made from any number of suitable segments 107. Control ring 101 is held in control ring carrier 105 for thermal isolation from outer air seal 109. Each control ring segment 107 includes an inner diameter surface 111 and an outer diameter surface 113. Inner and outer diameter surfaces, 111 and 113, respectively, include thermally isolating contacts 115. Thermally isolating contacts 115 have lower thermal conductivity than the control ring, thereby increasing the thermal isolation. While shown on both inner and outer diameter surfaces, 111 and 113, respectively, those skilled in the art will readily appreciate that thermally isolating contacts 115, can also be on only one of inner and outer diameter surfaces, 111 and 113, respectively, instead of both, or can vary throughout control ring 101.

As shown in FIG. 3A, each control ring segment 107 includes respective cavities 117 defined in inner and outer diameter surfaces, 111 and 113, respectively, with wedge shaped thermally isolating inlays 119 defined therein. Thermally isolating inlays 119, for example, can be made from ceramic. Thermally isolating inlays 119 extend to their respective inner and outer diameter surfaces, 111 and 113, respectively, and define thermally isolating contacts 115. Thermally isolating contacts 115, inlays 119, and cavities 117 are circumferentially spaced apart from other isolating contacts 115, inlays 119, and cavities 117, along their respective inner or outer diameter surfaces, 111 and 113, respectively. While shown on both inner and outer diameter surfaces, 111 and 113, respectively, those skilled in the art will readily appreciate that thermally isolating contacts 115, inlays 119, and cavities 117 can also be on only one of inner and outer diameter surfaces, 111 and 113, respectively, instead of both, or can vary throughout control ring 101. It is also contemplated that instead of, or in addition to, thermally isolating contacts 115 on inner and outer diameter surfaces, 111 and 113, respectively, thermally isolating contacts 115 can also be disposed on an inner diameter surface of carrier 105, e.g. the surface of carrier 105 that interfaces with outer diameter surface 113 of control ring 101.

As shown in FIG. 3B, thermally isolating inlays 119 can have a variety of shapes and orientations, for example, thermally isolating inlays 115 can be axially extending cylinders, radially extending cylinders, or blocks. Those skilled in the art will readily appreciate that during manufacture, inlays 119 are placed into cavities 117 and extend radially outward from their respective inner and outer diameter surfaces, 111 and 113. After placement, inlays 119 can be machined down to their respective inner and outer diameter surfaces, 111 and 113.

Figure 4:
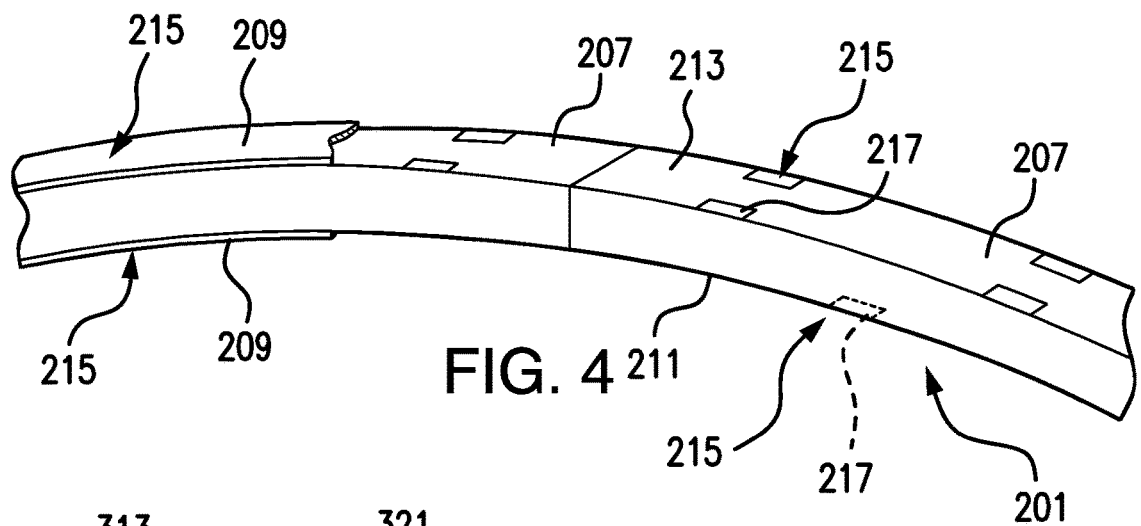
FIG. 4 is a perspective view of a portion of another embodiment of a control ring constructed in accordance with embodiments of the present disclosure, showing the control ring having thermally isolating coated portions.

With reference now to FIG. 4, control ring 201 is similar to control ring 101. Control ring 201 includes thermally isolating contacts 215 that are thermally isolating coatings 217 disposed on respective inner and outer diameter surfaces, 211 and 213, of control ring 201 instead of inlays, e.g. inlays 117. Control ring 201 also includes thermally isolating contacts 215 that are separate thermally isolating rings 209 operatively connected to respective inner and outer diameter surfaces, 211 and 213, respectively. It is contemplated that thermally isolating inlays, similar to inlays 119 of control ring 101, can also be incorporated into the segments 207 of control ring 201 and can be made from a ceramic material. It is also contemplated that instead of, or in addition to, thermally isolating contacts 215 on inner and outer diameter surfaces, 211 and 213, respectively, thermally isolating contacts 215 can also be disposed on an inner diameter surface of a carrier, e.g. carrier 105.

With continued reference to FIG. 4, while coatings 217 are shown as patches, those skilled in the art will readily appreciate that the entirety of ring 201 can be coated. While shown on both inner and outer diameter surfaces, 211 and 213, respectively, those skilled in the art will readily appreciate that thermally isolating coatings 217 can also be on only one of inner and outer diameter surfaces, 211 and 213, respectively, instead of both, or can vary throughout control ring 201. It is contemplated that thermally isolating rings 209 can be located on only one of inner and outer diameter surfaces, 211 and 213, respectively. It is also contemplated that the thermally isolating rings 209 can be separated into discrete arcuate segments. It is also contemplated that the thermally isolating rings 209 can be formed as a full hoop. A combination of these features is also contemplated.

Figure 5:
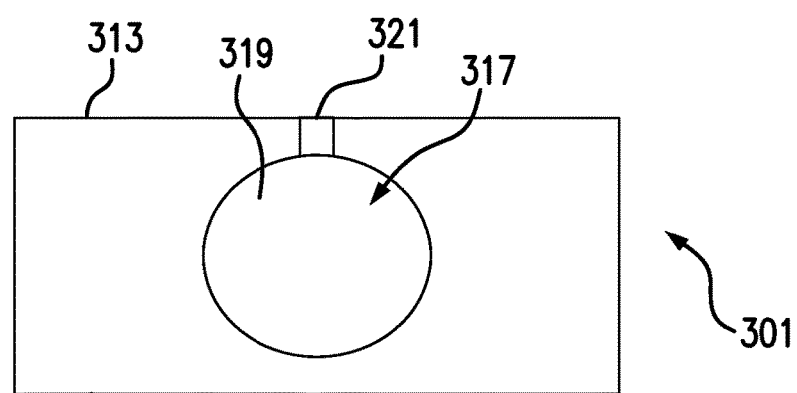
FIG. 5 is a cross-sectional side elevation view of another embodiment of a control ring constructed in accordance with embodiments of the present disclosure, showing the control ring having an internal cavity filled with a material having a higher heat capacitance than the control ring.

As shown in FIG. 5, control ring 301 is similar to control rings 101 and 201. Each segment 307 of control ring 301 includes an internal cavity 317 defined between inner and outer diameter surfaces, 311 and 313, respectively. Internal cavity 317 includes a fill material 319 having a higher heat capacitance than control ring 301. Control ring 301 includes a plug 321 to enclose internal cavity 317. Plug 321 can be welded or brazed between internal cavity 317 and outer diameter surface 313. It is contemplated that cavity 317 can be formed through casting, direct metal laser sintering (DMLS), or can be a welded ring assembly. It is contemplated that fill material 319 can be a fluid sealed inside the internal cavity. Those skilled in the art will readily appreciate that a variety of fill materials can be used, for example, a material with a higher heat capacity than control ring 301, such as, water, liquid ammonia, cement and/or lithium. By filling control ring 301 with a high heat capacitance material, the thermal response rate of control ring 301 is reduced, tending to better mirror the properties of a rotor disk. For example, water has a much higher heat capacity than metals, resulting in water taking much longer to heat up than metal.

Figure 6:
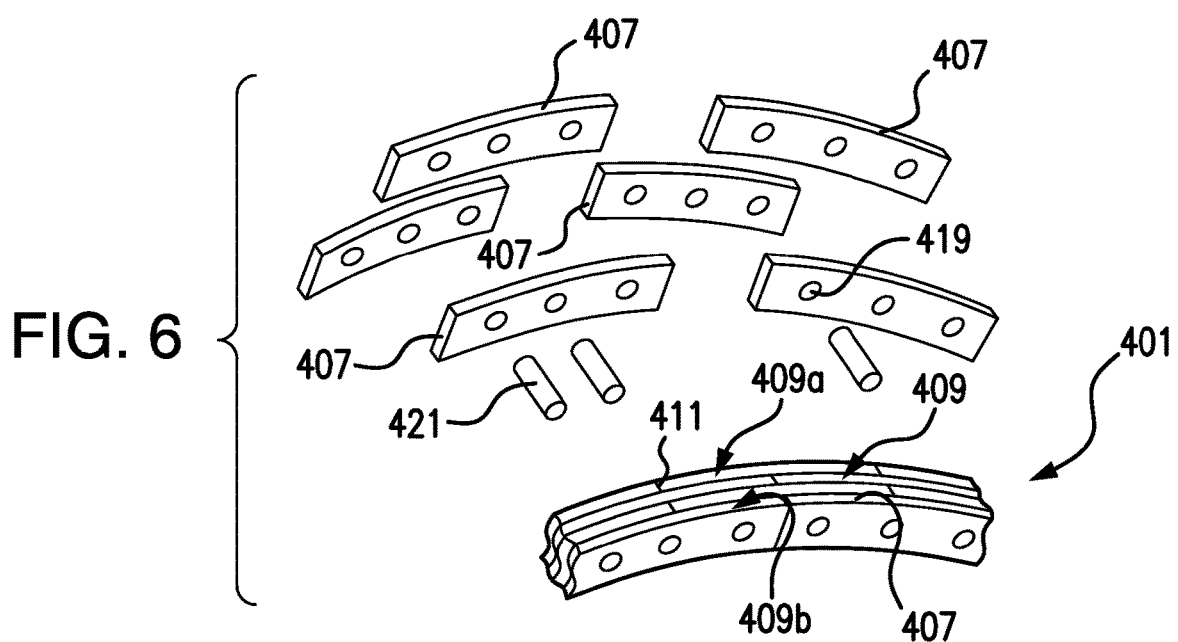
FIG. 6 is an exploded perspective view of a portion of another embodiment of a control ring constructed in accordance with embodiments of the present disclosure, showing the control ring having multiple plies of material.

With reference now to FIG. 6, control ring 401 includes a plurality of radially stacked rings 409, e.g. multiple plies of material, to achieve a desired thermal response rate. Each radially stacked ring 409 includes a plurality of arcuate segments 407 joined together to form ring 401. Radially stacked rings 409 each include holes 419 in order to be joined together using pins 421. Radially stacked rings 409 are made from a different material from another one of rings 409, e.g. ring 409a is a different material than ring 409b. Seams 411 are defined between the respective segments 407 of radially stacked rings 409. Respective seams 411 of one of the radially stacked rings, e.g. radially stacked ring 409a, are circumferentially offset from the respective seams 411 of the adjacent radially stacked ring 409. Those skilled in the art will readily appreciate that while control ring 401 is described as having multiple plies of different materials, each radially stacked ring 409 can be made from a single material.

The methods and systems as described above and shown in the drawings, can provide for control rings with superior properties including increased control over thermal properties, such as, conductivity, heat capacitance and thermal response. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A control ring for use in a gas turbine engine, the control ring comprising:

a ring shape defining a centerline axis, wherein the control ring includes an inner diameter surface and an outer diameter surface, wherein the inner diameter surface and the outer diameter surface extend in a circumferential direction, the control ring is configured for being supported in a control ring carrier that is disposed between a blade outer air seal and an external case; and a plurality of thermally isolating contacts that are circumferentially spaced along the control ring, operatively connected to at least one of the inner diameter surface and the outer diameter surface, wherein the thermally isolating contacts have lower thermal conductivity than the control ring, wherein each of the plurality of thermally isolating contacts is block shaped or cylindrical shaped and extends from a respective one of a plurality of cavities in the control ring, wherein the respective one of the plurality of cavities has a same shape as the respective one of the thermally isolating contacts, wherein each of the thermally isolating contacts extends exterior to the control ring and is configured to engage the control ring carrier to thereby support and thermally isolate the control ring within the control ring carrier; and the plurality of thermally isolating contacts extend radially outward from within the at least one of the inner diameter surface and the outer diameter surface.

2. A control ring as recited in claim 1, wherein the control ring comprises a plurality of control ring segments that are circumferentially joined together to form the control ring configured to be held in the control ring carrier for thermal isolation from the blade outer air seal.

3. A control ring as recited in claim 1, wherein one or more of the plurality of thermally isolating contacts extends from a respective one or more of the cavities on the outer diameter surface of the control ring segment, wherein the thermally isolating contacts are circumferentially spaced apart from one another.

4. A control ring as recited in claim 1, wherein one or more of the thermally isolating contacts extends from a respective one or more of the cavities on the inner diameter surface of the control ring segment.

5. A control ring as recited in claim 1, wherein the plurality of thermally isolating contacts are a plurality of thermally isolating inlays that are inlayed into the respective plurality of cavities in the control ring.

6. A control ring as recited in claim 5, wherein the control ring includes a plurality of the cavities on the inner diameter surface with a respective plurality of the thermally isolating inlays defined therein, wherein the plurality of thermally isolating inlays extending to the inner diameter surface and defining the thermally isolating contacts.

* * * * *